(12) United States Patent
Guerra

(10) Patent No.: US 6,434,781 B1
(45) Date of Patent: Aug. 20, 2002

(54) WHEEL CLEANER

(76) Inventor: Eligio Guerra, 7214 E. Berne St., Rosemead, CA (US) 91770

( * ) Notice: Subject to any disclaimer, the term of this patent is extended or adjusted under 35 U.S.C. 154(b) by 0 days.

(21) Appl. No.: 09/586,350

(22) Filed: Jun. 2, 2000

(51) Int. Cl.[7] .............................. A46B 15/00; B60S 1/68
(52) U.S. Cl. ..................... 15/256.5; 15/160; 280/855; 280/DIG. 6
(58) Field of Search ................................. 15/256.5, 160, 15/246; 280/855, 158.1, 856, DIG. 6

(56) References Cited

U.S. PATENT DOCUMENTS

| | | | |
|---|---|---|---|
| 725,843 A | * | 4/1903 | Henn, Jr. |
| 1,909,869 A | | 5/1933 | Randrup |
| 1,936,757 A | * | 11/1933 | Garvey |
| 3,231,293 A | | 1/1966 | Loustaunau |
| 4,605,239 A | | 8/1986 | Warfel |
| 4,841,591 A | | 6/1989 | Candow |
| 5,430,906 A | | 7/1995 | Drury |

FOREIGN PATENT DOCUMENTS

GB    1483047    *  8/1977

* cited by examiner

Primary Examiner—Randall E. Chin

(57) ABSTRACT

A new-wheel cleaner for cleaning the wheels of a golf bag cart. The inventive device includes a mounting bracket adapted for mounting to the leg of a golf bag hand cart. The first end of a primary arm is coupled to the mounting bracket. The second end of the primary arm is coupled to the first end of a secondary arm. A top brush is coupled to the second end of the secondary arm. A pair of spaced apart side brushes are coupled to the top brush.

10 Claims, 2 Drawing Sheets

WHEEL CLEANER

BACKGROUND OF THE INVENTION

1. Field of the Invention

The present invention relates to accessories for golf bag carts and more particularly pertains to a new wheel cleaner for cleaning the wheels of a golf bag cart.

2. Description of the Prior Art

The use of accessories for golf bag carts is known in the prior art. More specifically, accessories for golf bag carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art accessories for golf bag carts include U.S. Pat. No. 4,605,239; U.S. Pat. No. 3,231,293; U.S. Pat. No. 4,841,591; PCT Patent No. WO 96/07553 (Inventors: MacDonald et al.);. U.S. Pat. No. 5,430,906; U.S. Pat. No. 1,909,869; and PCT Patent No. WO 95/23715 (Inventor: Heise).

While these devices fulfill their respective, particular objectives and requirements, the aforementioned patents do not disclose a new wheel cleaner. The inventive device includes a mounting bracket adapted for mounting to the leg of a golf bag hand cart. The first end of a primary arm is coupled to the mounting bracket. The second end of the primary arm is coupled to the first end of a secondary arm. A top brush is coupled to the second end of the secondary arm. A pair of spaced apart side brushes are coupled to the top brush.

In these respects, the wheel cleaner according to the present invention substantially departs from the conventional concepts and designs of the prior art, and in so doing provides an apparatus primarily developed for the purpose of cleaning the wheels of a golf bag cart.

SUMMARY OF THE INVENTION

In view of the foregoing disadvantages inherent in the known types of accessories for golf bag carts now present in the prior art, the present invention provides a new wheel cleaner construction wherein the same can be utilized for cleaning the wheels of a golf bag cart.

The general purpose of the present invention, which will be described subsequently in greater detail, is to provide a new wheel cleaner apparatus and method which has many of the advantages of the accessories for golf bag carts mentioned heretofore and many novel features that result in a new wheel cleaner which is not anticipated, rendered obvious, suggested, or even implied by any of the prior art accessories for golf bag carts, either alone or in any combination thereof.

To attain this, the present invention generally comprises a mounting bracket adapted for mounting to the leg of a golf bag hand cart. The first end of a primary arm is coupled to the mounting bracket. The second end of the primary arm is coupled to the first end of a secondary arm. A top brush is coupled to the second end of the secondary arm. A pair of spaced apart side brushes are coupled to the top brush.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheel cleaner apparatus and method which has many of the advantages of the accessories for golf bag carts mentioned heretofore and many novel features that result in a new wheel cleaner which is not anticipated, rendered obvious, suggested, or even implied by any of the prior art accessories for golf bag carts, either alone or in any combination thereof.

It is another object of the present invention to provide a new wheel cleaner which may be easily and efficiently manufactured and marketed.

It is a further object of the present invention to provide a new wheel cleaner which is of a durable and reliable construction.

An even further object of the present invention is to provide a new wheel cleaner which is susceptible of a low cost of manufacture with regard to both materials and labor, and which accordingly is then susceptible of low prices of sale to the consuming public, thereby making such wheel cleaner economically available to the buying public.

Still yet another object of the present invention is to provide a new wheel cleaner which provides in the apparatuses and methods of the prior art some of the advantages thereof, while simultaneously overcoming some of the disadvantages normally associated therewith.

Still another object of the present invention is to provide a new wheel cleaner for cleaning the wheels of a golf bag cart.

Yet another object of the present invention is to provide a new wheel cleaner which includes a mounting bracket adapted for mounting to the leg of a golf bag hand cart. The first end of a primary arm is coupled to the mounting bracket. The second end of the primary arm is coupled to the first end of a secondary arm. A top brush is coupled to the second end of the secondary arm. A pair of spaced apart side brushes are coupled to the top brush.

Still yet another object of the present invention is to provide a new wheel cleaner that cleans dirt and grass off of the wheels of a golf bag cart to keep the wheels clean.

Even still another object of the present invention is to provide a new wheel cleaner that has brushes that may be conveniently folded out of the way when not in use.

These together with other objects of the invention, along with the various features of novelty which characterize the invention, are pointed out with particularity in the claims, annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
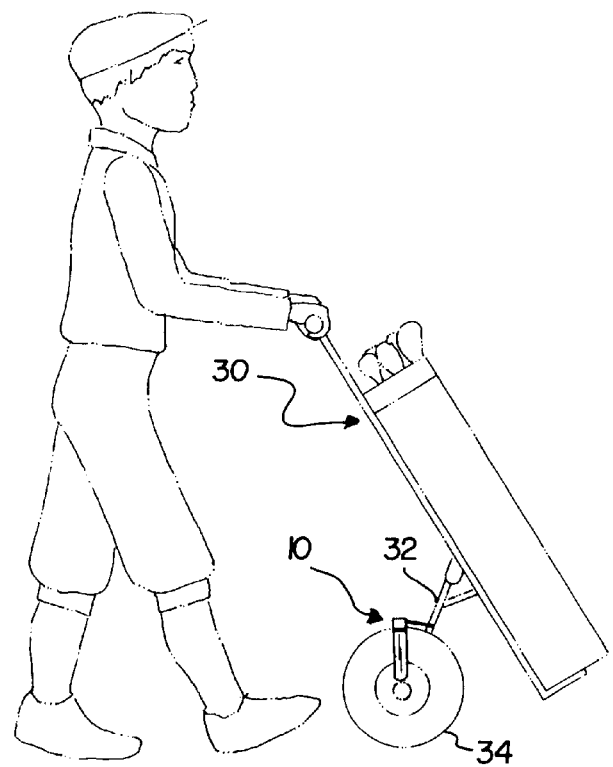
FIG. 1 is a schematic side view of a new wheel cleaner according to the present invention.

With reference now to the drawings, and in particular to FIGS. 1 through 4 thereof, a new wheel cleaner embodying the principles and concepts of the present invention and generally designated by the reference numeral 10 will be described.

Figure 2:
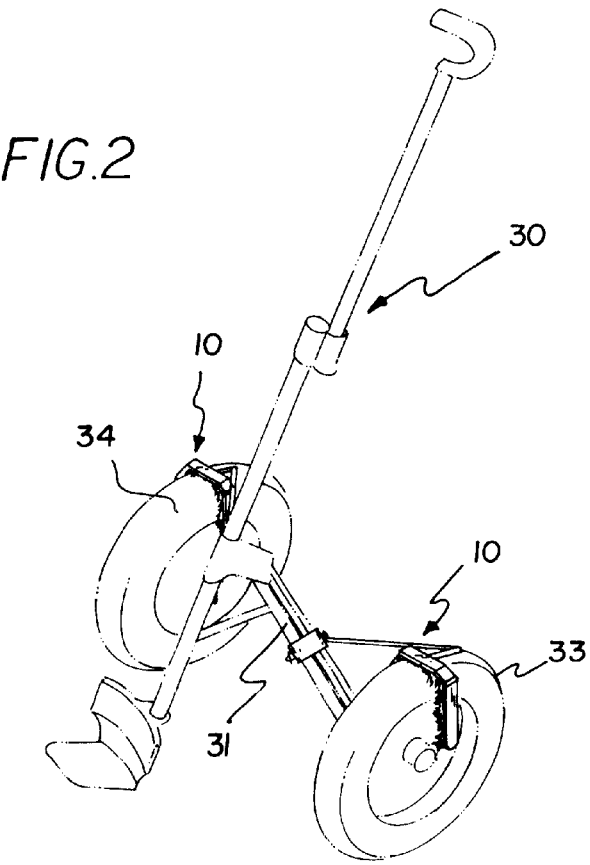
FIG. 2 is a schemiatic perspective view of a golf bag hand cart with the present invention mounted to each of the legs of the golf bag hand cart.

In use, the attachment 10 is designed for cleaning a wheel of golf bag hand cart 30. In particular, a golf bag hand cart 30 having a pair of downwardly depending legs 31,32 with each leg having a wheel 33,34 rotatably mounted thereto. Each wheel has a perimeter tread 35 and front and back sides 36,37. It should be noted, as illustrated in FIG. 2, that it is desirable that an attachment 10 be mounted to each of the legs of the golf bag hand cart to help clean both wheels of the golf bag hand cart. As best illustrated in FIGS. 1 through 4, the wheel cleaner 10 generally comprises a mounting bracket 12 adapted for mounting to the leg of a golf bag hand cart. The first end of a primary arm 13 is coupled to the mounting bracket 12. The second end 15 of the primary arm 13 is coupled to the first end of a seconndary arm 16. A top brush 20 is coupled to the second end 18 of the secondary arm 16. A pair of spaced apart side brushes 21,22 are coupled to the top brush 20.

In closer detail, the mounting bracket 12 is adapted for mounting to the leg 33 of a golf bag hand cart 30. The elongate primary arm 13 has opposite first and second ends 14,15 which define the length of the primary arm therebetween. The first end 14 of the primary arm 13 is pivotally coupled to the mounting bracket 12. Like the primary arm, the elongate secondary arm 16 has opposite first and second ends 17,18 which define the length of the secondary arm 16 therebetween. The first end 17 of the secondary arm 16 is pivotally coupled to the second end 15 of the primary arm 13. Preferably, the length of the secondary arm 16 is releasably holdable in a position with respect to the length of the primary arm 13 by a threaded bolt 27 and wing nut 28 combination (which also preferably forms the pivot coupling of the first end 17 of the secondary arm 16 to the second end 15 of the primary arm 13).

Figure 3:
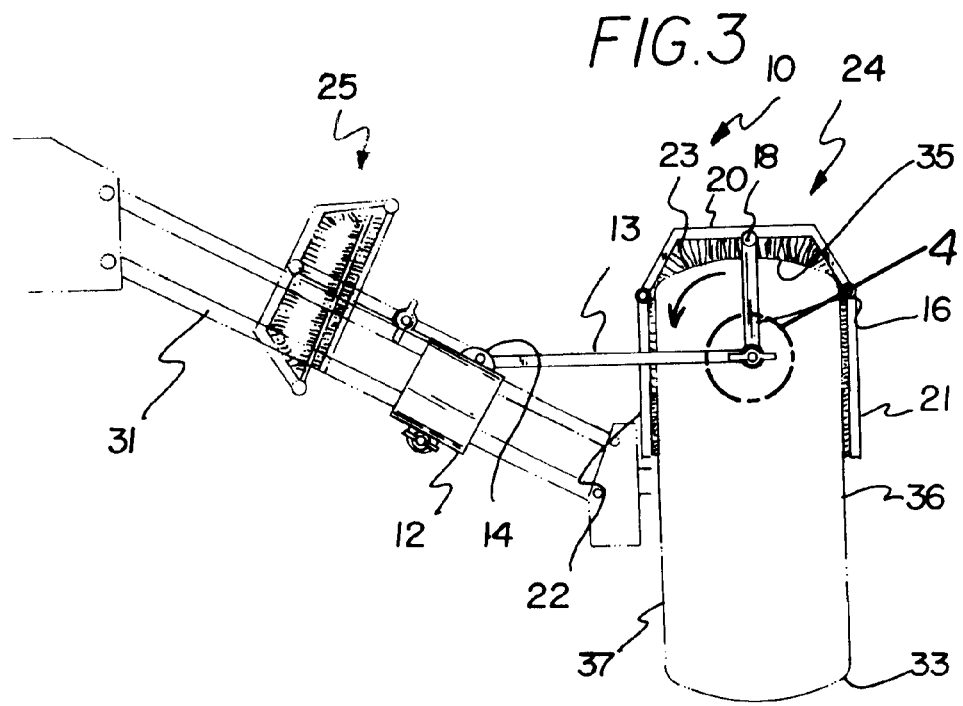
FIG. 3 is a schematic base side view of the present invention.
Figure 4:
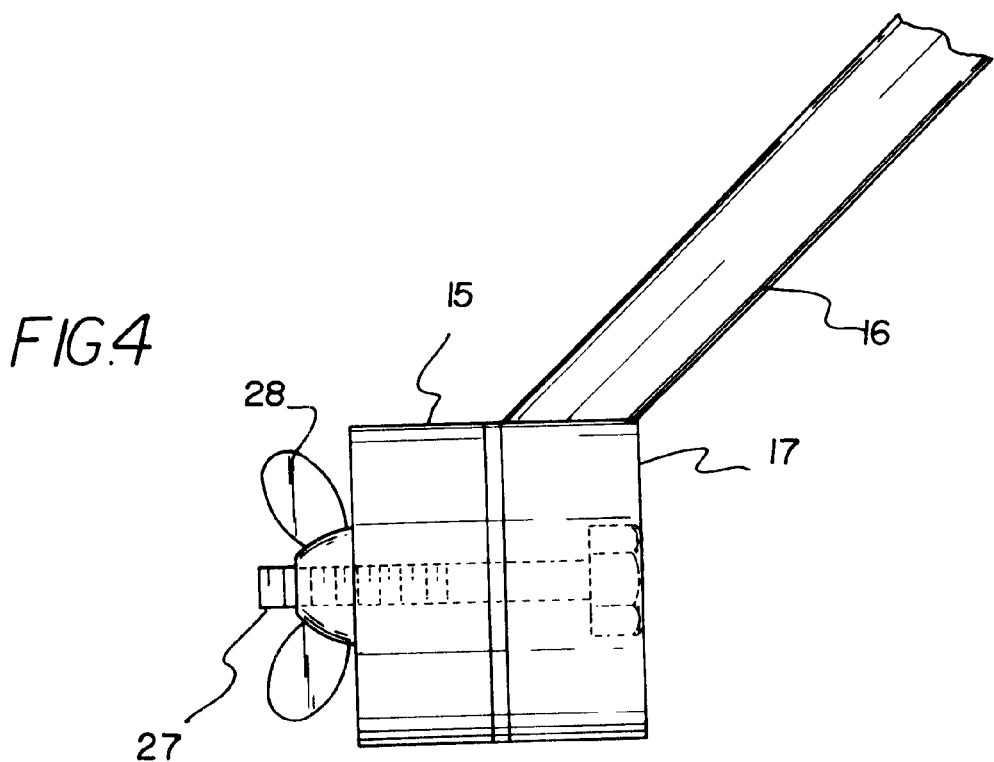
FIG. 4 is a schematic side view of the present invention taken from the circle on FIG. 4.

The attachment 10 also includes a top brush 20 and a pair of spaced apart side brushes 21,22. Each of the brushes 20,21,22 has a plurality of bristles 23. The side brushes 21,22 are each pivotally coupled to the top brush 20. The top brush 20 is also pivotally coupled to the second end 18 of the secondary arm 16. With reference to FIG. 3, the brushes 20,21,22 positionable between a deployed position 24 and a folded position 25. When in the deployed position, the side brushes 21,22 are generally parallel to each other and the top brush 20 is generally perpendicular to the side brushes 21,22. The brushes define a wheel space therebetween adapted for receiving a wheel 33 of golf bag hand cart 30 therein when the brushes are positioned in the deployed position. In use, the wheel 33 of a golf bag hand cart 30 should be extended into the wheel space such that the top brush 20 extends across the width of the perimeter tread 35 of the wheel and the side brushes 21,22 are positioned adjacent either side 36.37 of the wheel with each extending from the perimeter tread towards the center or axle of the wheel. This way, the bristles 23 of the brushes extend into wheel space so that the bristles 23 are abutted against the associated portion of the wheel so that the bristles 23 wipe debris off of the wheel as the wheel is rotated. Ideally, the length of the top brush 20 is adapted for extending across the width of the perimeter tread 35 of a wheel 33 of a golf bag hand cart 30 while the lengths of the side brushes 21,22 are adapted for extending from the perimeter tread of a wheel of a golf bag hand cart 30 to about the center of the wheel of a golf bag hand cart 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired. to limit the invention to the exact construction and operation shown and described, and accordingly, all suitable modifications and equivalents may be resorted to, falling within the scope of the invention.

I claim:

1. An attachment for cleaning a wheel of a golf bag hand cart, the golf bag hand cart having a pair of downwardly depending legs, each leg having a wheel rotatably mounted thereto, each wheel having a perimeter tread and front and back sides, said attachment comprising:

a mounting bracket being adapted for mounting to the leg of a golf bag hand cart;

an elongate primary arm having opposite first and second ends;

said first end of said primary arm being coupled to said mounting bracket;

an elongate secondary arm having opposite first and second ends;

said first end of said secondary arm being coupled to said second end of said primary arm;

a top brush and a pair of spaced apart side brushes, each of said brushes having a plurality of bristles, each of said side brushes being coupled to said top brush;

said top brush being coupled to said second end of said secondary arm;

said brushes defining a wheel space therebetween adapted for receiving a wheel of golf bag hand cart; and said bristles of said brushes extending into wheel space.

2. The attachment of claim 1, wherein said first end of said secondary arm is pivotally coupled to said second end of said primary arm.

3. The attachment of claim 2, wherein said primary arm has a length defined between said first and second ends of said primary arm, wherein said secondary arm has a length defined between said first and second ends of said secondary arm, and wherein said length of said secondary arm is releasably holdable in a position with respect to said length of said primary arm.

4. The attachment of claim 3, wherein a hold means releasably holds said secondary arm in a position with respect to said primary arm.

5. The attachment of claim 1, wherein said first end of said primary arm is pivotally coupled to said mounting bracket.

6. The attachment of claim 1, wherein said top brush is pivotally coupled to said second end of said secondary arm.

7. The attachment of claim 1, wherein said brushes are positionable between a deployed position and a folded position, said side brushes being generally parallel to each other when said brushes are in said deployed position, said top brush being generally perpendicular to said side brushes when said brushes are in said deployed position.

8. The attachment of claim 7, wherein said wheel spaces is defined by said brushes when said brushes are positioned in said deployed position.

9. The attachment of claim 1, wherein each of said brushes has a length, said length of said top brush being adapted for extending across the width of the perimeter tread of a wheel of a golf bag hand cart, said lengths of said side brushes being adapted for extending from the perimeter tread of a wheel of a golf bag hand cart to about the center of the wheel of a golf bag hand cart.

10. An attachment for cleaning a wheel of a golf bag hand cart, the golf bag hand cart having a pair of downwardly depending legs, each leg having a wheel rotatably mounted thereto, each wheel having a perimeter tread and front and back sides, said attachment comprising:

amounting bracket being adapted for mounting to the leg of a golf bag hand cart;

an elongate primary arm having opposite first and second ends, said primary arm having a length defined between said first and second ends of said primary arm;

said first end of said primary arm being pivotally coupled to said mounting bracket;

an elongate secondary arm having opposite first and second ends, said secondary arm having a length defined between said first and second ends of said secondary arm;

said first end of said secondary arm being pivotally coupled to said second end of said primary arm, said length of said secondary arm being releasably holdable in a position with respect to said length of said primary arm;

a top brush and a pair of spaced apart side brushes, each of said brushes having a plurality of bristles, each of said side brushes being pivotally coupled to said top brush;

said top brush being pivotally coupled to said second end of said secondary arm;

said brushes being positionable between a deployed position and a folded position, said side brushes being generally parallel to each other when said brushes are in said deployed position, said top brush being generally perpendicular to said side brushes when said brushes are in said deployed position;

said brushes defining a wheel space therebetween adapted for receiving a wheel of golf bag hand cart therein when said brushes are positioned in said deployed position;

said bristles of said brushes extending into wheel space when said brushes are positioned in said deployed position; and wherein each of said brushes has a length, said length of said top brush being adapted for extending across the width of the perimeter tread of a wheel of a golf bag hand cart, said lengths of said side brushes being adapted for extending from the perimeter tread of a wheel of a golf bag hand cart to about the center of the wheel of a golf bag hand cart.

* * * * *